(12) United States Patent
Graves

(10) Patent No.: US 9,605,550 B2
(45) Date of Patent: Mar. 28, 2017

(54) BI-METAL STRIP-SEAL

(71) Applicant: Rolls-Royce Corporation, Indianapolis, IN (US)

(72) Inventor: Charles Bryce Graves, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 481 days.

(21) Appl. No.: 14/137,409

(22) Filed: Dec. 20, 2013

(65) Prior Publication Data
US 2014/0248120 A1 Sep. 4, 2014

Related U.S. Application Data

(60) Provisional application No. 61/771,664, filed on Mar. 1, 2013.

(51) Int. Cl.
*F23R 3/00* (2006.01)
*F16K 31/00* (2006.01)
(Continued)

(52) U.S. Cl.
CPC .......... *F01D 11/003* (2013.01); *F01D 11/005* (2013.01); *F02M 31/07* (2013.01); *F16J 15/0806* (2013.01); *F16J 15/164* (2013.01); *F16K 31/002* (2013.01); *F23R 3/002* (2013.01); *F23R 3/007* (2013.01); *G05D 23/1854* (2013.01); *G05D 23/2754* (2013.01); *F05D 2240/35* (2013.01); *F05D 2240/57* (2013.01); *F05D 2270/303* (2013.01); *F05D 2270/42* (2013.01); *F05D 2300/175* (2013.01); *F05D 2300/505* (2013.01); *F05D 2300/6033* (2013.01); *F23M 2900/05002* (2013.01); *F23M 2900/05005* (2013.01); *F23R 3/26* (2013.01);
(Continued)

(58) Field of Classification Search
CPC ... F16K 21/002; F16K 31/002; H01B 1/0213; G05D 23/1854; G05D 23/2754; F23R 3/002; F23R 3/007; F23R 3/26
USPC ........................................ 236/101 R, 101 E
See application file for complete search history.

(56) References Cited

U.S. PATENT DOCUMENTS 3,577,878 A * 5/1971 Greenwood ............. F23R 3/26
60/39.23
3,691,761 A * 9/1972 Jackson .................... F23R 3/26
60/39.23
(Continued)

FOREIGN PATENT DOCUMENTS

WO    WO-0070192 A1    11/2000

OTHER PUBLICATIONS

Int'l. Search Report for PCTUS2013073194 mailed Mar. 27, 2014.

*Primary Examiner* — Phutthiwat Wongwian
*Assistant Examiner* — Rene Ford
(74) *Attorney, Agent, or Firm* — Fishman Stewart PLLC

(57) ABSTRACT

An improved seal assembly for use with a combustion liner assembly is employed with a gas turbine engine so as to control fluid flow. The seal assembly has a bi-metal sealing member that is affixed to a first surface that is proximal to a second perpendicular surface that is not in contact with the first surface, thus providing a potential fluid flow path. Upon heating, the bi-metal sealing member "uncoils" contacting the second perpendicular surface, thus blocking the flowpath between the two surfaces. Various metals may be provided to provide predetermined sealing characteristics.

20 Claims, 3 Drawing Sheets

(51) Int. Cl.
    *G05D 23/27*         (2006.01)
    *F02M 31/07*        (2006.01)
    *F23R 3/26*          (2006.01)
    *F01D 11/00*        (2006.01)
    *G05D 23/185*       (2006.01)
    *G05D 23/275*       (2006.01)
    *F16J 15/16*         (2006.01)
    *F16J 15/08*         (2006.01)

(52) U.S. Cl.
    CPC ... *F23R 2900/00012* (2013.01); *Y02T 50/672* (2013.01); *Y10T 137/7737* (2015.04); *Y10T 137/7847* (2015.04)

(56) References Cited

U.S. PATENT DOCUMENTS

| | | | | |
|---|---|---|---|---|
| 3,765,171 A | * | 10/1973 | Hagen | F23R 3/26 60/39.23 |
| 3,888,411 A | * | 6/1975 | Florine | B60K 13/02 123/585 |
| 3,895,812 A | * | 7/1975 | Harr, Jr. | F16J 15/0806 105/424 |
| 3,975,114 A | | 8/1976 | Kalkbrenner | |
| 4,296,599 A | * | 10/1981 | Adamson | F02C 7/18 415/115 |
| 4,384,671 A | * | 5/1983 | Hayes | F23L 11/005 236/1 G |
| 4,542,622 A | * | 9/1985 | Greene | F23C 7/004 239/406 |
| 4,650,397 A | | 3/1987 | Rogo | |
| 4,658,847 A | | 4/1987 | McCrone | |
| 4,673,187 A | | 6/1987 | Hanson et al. | |
| 4,813,608 A | | 3/1989 | Holowach et al. | |
| 5,197,290 A | * | 3/1993 | Lee | F23R 3/14 137/855 |
| 5,333,443 A | * | 8/1994 | Halila | F23R 3/002 60/752 |
| 5,913,678 A | * | 6/1999 | Hocker | F01D 11/005 432/247 |
| 6,186,123 B1 | | 2/2001 | Maier et al. | |
| 7,594,792 B2 | | 9/2009 | Audeon et al. | |
| 7,677,044 B2 | * | 3/2010 | Barbeln | F23R 3/007 277/641 |
| 8,210,799 B1 | * | 7/2012 | Rawlings | F01D 11/005 277/654 |
| 8,789,833 B2 | * | 7/2014 | Zheng | F16J 15/0887 277/644 |
| 2002/0056277 A1 | * | 5/2002 | Parry | F23M 5/04 60/752 |
| 2002/0074742 A1 | | 6/2002 | Quoiani | |
| 2003/0047878 A1 | * | 3/2003 | Bolms | F01D 11/08 277/359 |
| 2003/0057655 A1 | | 3/2003 | Chehab et al. | |
| 2010/0089468 A1 | * | 4/2010 | Scott | F23R 3/06 137/468 |
| 2011/0057392 A1 | | 3/2011 | Monnet et al. | |
| 2011/0185740 A1 | * | 8/2011 | Dierberger | F23M 5/02 60/755 |
| 2011/0280771 A1 | | 11/2011 | Okabe | |
| 2012/0038114 A1 | | 2/2012 | Henne et al. | |
| 2012/0219405 A1 | * | 8/2012 | Szwedowicz | F01D 11/006 415/173.3 |

\* cited by examiner

BI-METAL STRIP-SEAL

CROSS-REFERENCE TO RELATED APPLICATIONS

This application claims priority to U.S. Provisional Patent Application No. 61/771,664, filed Mar. 1, 2013, the contents of which are hereby incorporated in their entirety.

FIELD OF TECHNOLOGY

An improved seal member for use in connection with machines such as, but not limited to gas turbine engines, and more particularly, sealing systems that are operable in conditions where there is minimal pressure to force a mechanical seal into place, or also in environments where there is an elevated temperature which makes usage of mechanical springs impractical.

BACKGROUND

Gas turbine engines are used extensively in high performance aircraft and they employ compressors, combustors and turbines that generate massive air flows that circulate throughout the engine's systems. By controlling the air flow greater efficiencies and economical performance can be achieved which is desired in the competitive airline industry.

Gas turbine engine combustors are subjected to and must meet stringent emission standards. This means that the temperatures within the combustors may increase as cooling air is diverted to the inside of the combustor to control emissions. A combustor can have an inner and outer liner, and tiles can be used to line the inner wall of combustor to aid in thermal control and dissipation. Tiles can have a maximum operating temperature of about 1150° C. and are desirable to use in such extreme operating conditions. Controlling air flow across the tiles and in between the tiles that line a combustor is a challenge as traditional sealing systems have deficiencies that have yet to be resolved.

Combustor tiles may be constructed of ceramic matrix composite material. Mechanical seals, such as a leaf seal, however are typically metallic in construction and operate primarily by pressure being exerted on a moving member of the seal. As pressure is exerted on the seal, it tends to cause the moving member to deflect and move towards a closed position which in turn may close off a fluid flow path that may be located between combustor tiles or in proximity of the combustor. Such arrangement allows the seal to manipulate between an open fluid flow position and a closed fluid flow position. A spring may be employed to aid in influencing the seal to an open or closed position, depending on the arrangement of the seal. In environments where operating temperatures exceed the operating capacity of springs, it may not be permissible to use conventional seals.

A leaf seal tends to relax at elevated temperatures. And in environments where there is inadequate pressure to force a leaf seal to move, it may not perform adequately. For example, if the operating pressure is too low, the seal member may not move, and thus, it may not close off the fluid flow path. Such characteristic would not be helpful in arrangements where it is desired to close off fluid flow paths that operate between combustor liners and surrounding combustor tiles.

Thus, a problem exists with sealing combustion liners and controlling flow paths in low pressure and high temperature settings. Mechanical seals have been used but lack the flexibility necessary for this environment. Accordingly, an exemplary seal system will create a seal even when there is insufficient pressure to force a seal into position. Employing a seal system that operates irrespective of pressures within the system would be helpful to the aircraft industry and to other industries where controlling fluid low in low pressure settings is desirable.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

The exemplary embodiments disclosed herein provide a sealing system in environments where there is inadequate pressure to force a seal, such as a leaf seal or some other pressure or the like actuated device, mechanical or otherwise, to perform adequately. The sealing systems disclosed herein may be used in turbomachines, and in particular, in connection with a gas turbine combustor having CMC (ceramic matrix composite) liner. The elevated temperature of the machine causes the sealing system to manipulate irrespective of the operating pressures of the machine. It will be appreciated that such a sealing system can be used in other machinery, applications and environments wherever fluid flow is to be controlled.

Figure 1:
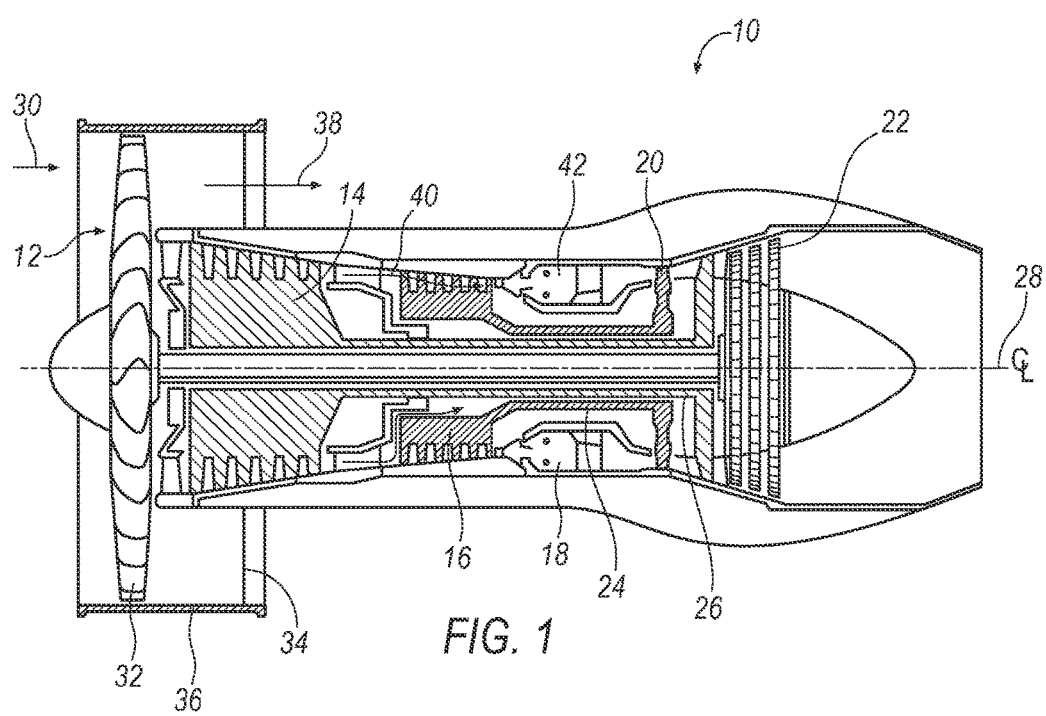
FIG. 1 illustrates a schematic view of a gas turbine.

FIG. 1 illustrates a gas turbine engine 10, which includes a fan 12, a low pressure compressor and a high pressure compressor, 14 and 16, a combustor 18, and a high pressure turbine and low pressure turbine, 20 and 22, respectively. The high pressure compressor 16 is connected to a first rotor shaft 24 while the low pressure compressor 14 is connected to a second rotor shaft 26. The shafts extend axially and are parallel to a longitudinal center line axis 28.

Ambient air 30 enters the fan 12 and is directed across a fan rotor 32 in an annular duct 34, which in part is circumscribed by fan case 36. The bypass airflow 38 provides engine thrust while the primary gas stream 40 is directed to the combustor 18 and the high pressure turbine 20. The gas turbine engine 10 includes an improved combustor 18 having a sealing system 42 for improving the control of fluid flow about the combustor 18. It will be appreciated that the sealing system 42 could be used in other machinery and is not therefor limited to gas turbine engine environments.

Figure 2:
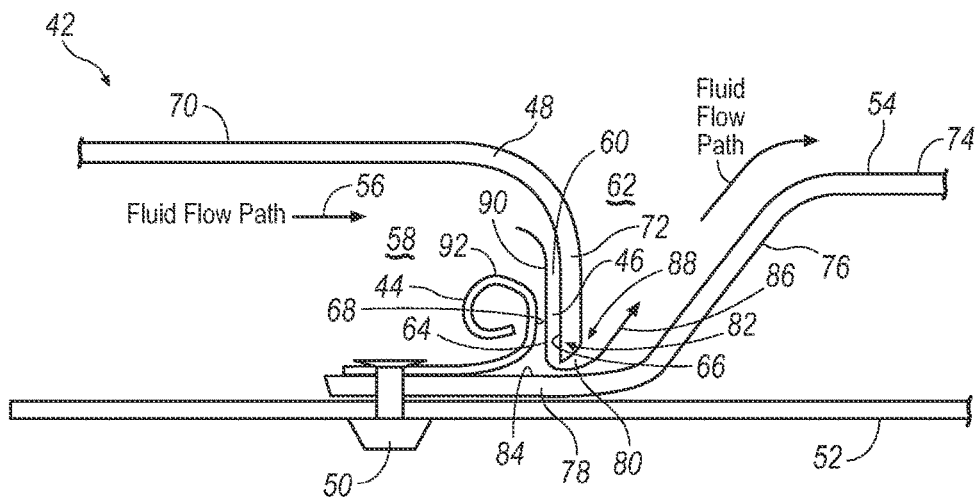
FIG. 2 illustrates a scrolled bi-metal seal assembly, showing the seal member in its open position for permitting fluid flow.

With reference to FIG. 2, an enlarged side sectional view is shown of an exemplary sealing system 42 in a relaxed, not-yet-engaged state. This illustration represents a lower temperature state in which a gas turbine combustor system may be operating. A fluid such as a gas is allowed to flow between tiles during this state. However, the system may change its configuration to impede fluid flow at elevated temperatures. Conversely, if temperatures reduce then the system may revert back to a static state and thus open again the fluid flow path.

The sealing system 42 includes a bimetal strip 44 to form a seal 46 against a first tile member 48. The bi-metal strip 44 is secured by a fastener 50 to a combustor liner 52 and a second tile 54. A fluid flow path 56 enters a first chamber 58 adjacent the first tile member 48, passes around the bimetal strip 44 at a clearance point 60, which in turn permits fluid flow to a second chamber 62. The clearance point 60 partially defines an open fluid channel 64 that is bound in part on one side by a surface 66 of the first tile 48 and in part by the surface 68 of the bimetal strip 44.

The first tile 48 has a flattened linear portion 70 and a substantially perpendicular member 72 depending from the flattened linear portion 70. The tile may be constructed from CMC material that is suitable for gas turbine engine environments. It will be appreciated that the tile 48 may be constructed from other materials. The second tile 54 has a flattened linear surface 74, a sloped surface 76, and another flat surface 78. The second tile 54 may be made of the same material as the first tile 48. An offset 80 is provided near the tip 82 of the tile 48 and an upper surface 84 of the second tile 54. The offset 80 provides a flow path 86 for fluid to pass between the first chamber 58 and the second chamber 62. A joint 88 is located between the tip 82 and the upper surface 84 and the area of the offset 80 may fluctuate as the machine 10 oscillates during operation. The joint 88 during certain operating conditions needs to be sealed. The strip 44 forms a seal 46 to accomplish the closing of the joint 88.

The bimetal strip 44 is a flexible material that is operable to change geometric configurations based on the operating temperatures of the combustor 18. The strip 44 is able to flex and unroll between different states as is shown in the figures. The strip 44 is constructed of more than one material and can be designed to perform differently based upon operating temperature ranges and/or desired "uncoiling" characteristics. Examples of the type of material the strip 44 could be constructed from include, but are not limited to, Inco 625 and Haynes 230. Unlike springs that may relax at elevated temperatures, the scroll-shaped bimetal strip 44 has a significant sealing force which improves as temperature increases within a system, such as a gas turbine engine 10.

The bi-metal strip 44 is attached adjacent to the linear line 90 of the leakage path 86. Accordingly, as the strips 44 are installed they will be sufficiently out of the way to not be crushed by the tiles 48 and 54 as they are being assembled. This features helps with the installation of the system 42 as it is not possible to easily inspect the strips 44 after the tiles have been installed.

In operation, when the system 10 first ignites, the combustor 18 has not yet reached an elevated temperature. During this condition the bi-metal strip 44 is in a coiled up static like configuration as is shown in FIG. 2. The fluid channel 64 remains open thus allowing gas to flow along a flow path 86. The joint 88 is open and allows fluid to pas to the second chamber 62.

Figure 3:
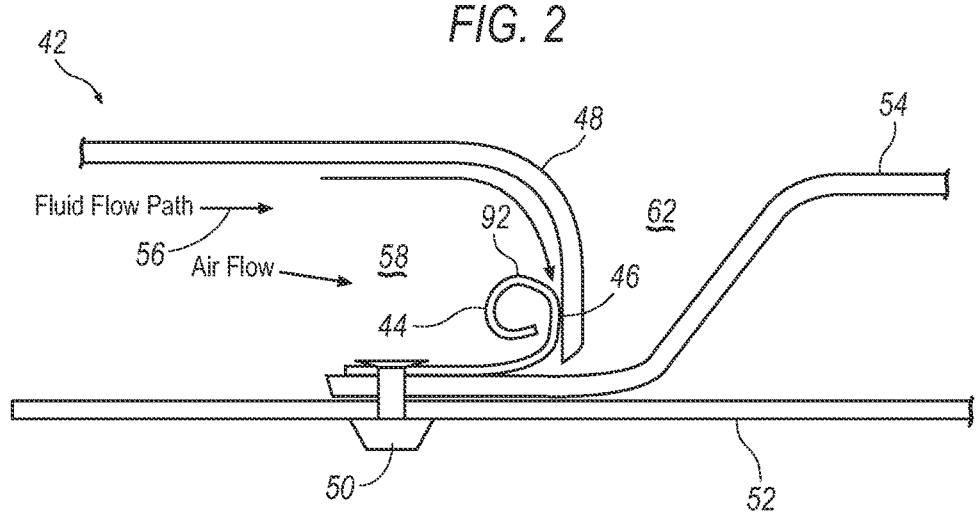
FIG. 3 illustrates the bi-metal seal assembly, showing the seal member starting to unroll and engage a sealing surface, which occurs as temperatures increase.

FIG. 3 illustrates the sealing system 42 where the strip 44 has expanded to a closed position, thus precluding airflow through a path. This represents an elevated temperature state. It will be appreciated that the bimetal strip 44 could have different properties, thus allowing varying predetermined performance characteristics for the sealing system. As the engine 10 reaches traditional operating conditions, the differing thermal expansions of the two materials causes the scroll 92 of the strip 44 to unroll toward the joint 88 and press against the tile surface 66. Any resulting heat transfer from the tile 48 to the strip 44 may cause the scroll 92 to force itself with greater force against the tile's sealing surface 66. As this occurs a seal 46 is formed between the tile 48 and the strip 44.

Figure 4:
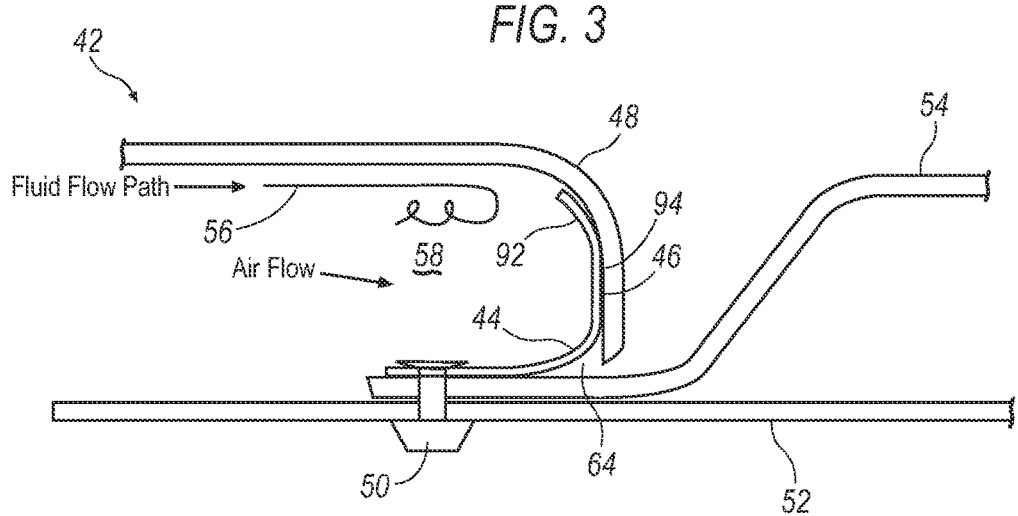
FIG. 4 illustrates the bi-mental seal assembly, showing the seal member fully deployed and engaging the sealing surface.

FIG. 4 illustrates the FIG. 3 system 42 where the operating temperatures of the combustor 18 have increased. Here the strip 44 has fully deployed to a form where the scroll 92 has formed an elongated sealing surface 94. The elongated sealing surface 94 conforms substantially with the surface 66 of the tile 48. The elongated sealing surface is maintained as long as the temperatures remain at an elevated level. An enhanced seal 46 is formed as a result of the elongated sealing surface 94. This causes the fluid channel 64 to be substantially closed off and fluid flow path 56 to be rerouted so that the flow of gas recirculates with in first chamber 58. Chamber 62 is blocked off from the flow path 86 at this stage.

As the operating temperatures reduce in the combustor 18, the strip seal 44 will re-coil as is shown in FIG. 3 and ultimately once a lowered temperature state is achieved, the strip seal 44 completely disengages from the tile 48, as is shown in FIG. 2. Once this event occurs, the join 88 is open and fluid flows again to the second chamber 62. This cycle may repeat over and over again.

Figure 5:
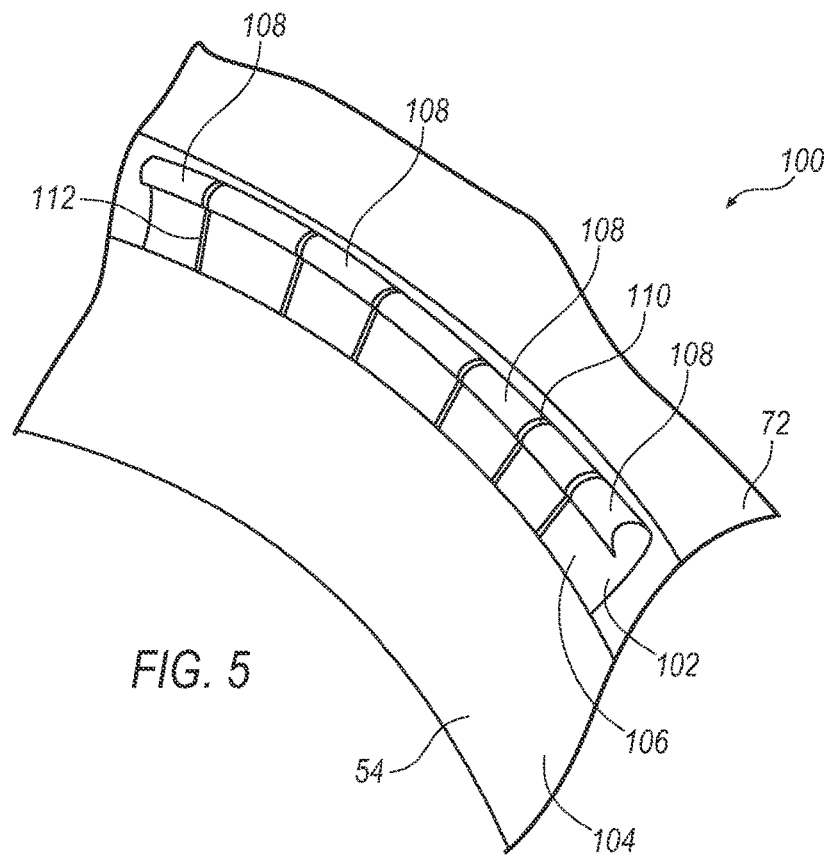
FIG. 5 illustrates an alternative embodiment bi-metal seal assembly, showing a bi-metal scroll seal system having a segmented arc shaped seal configuration.

With reference to FIG. 5, an alternative exemplary embodiment seal system 100 is disclosed. The seal system 100 includes an elongated bi-metal seal 102 that has been applied to a curved surface 104. A perpendicular surface 72 lays adjacent to the curved surface 104. The elongated seal 102 may be in the form of a continuous sheet 106 having a plurality of individual strip segments 108. Each such segment 108 is positioned adjacent to one another and are separated by a gap 110. The continuous sheet 106 may be affixed to the curved surface 104 by convention means. In order for each strip segment 108 to unroll effectively, longitudinal split lines 112 may be provided to allow it to conform to the curved surface 104. These split lines 112 could be a source of fluid leakage. Thus, it may be desirable to provide a second layer of split seals staggered in a "shingle arrangement" to reduce this leakage.

Figure 6:
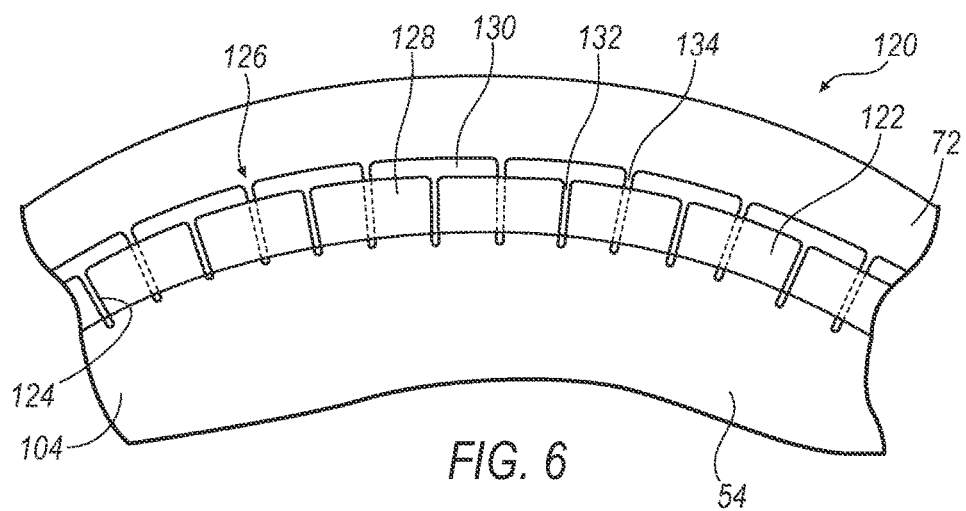
FIG. 6 illustrates another alternative embodiment bi-metal seal assembly, showing a bi-metal scroll seal system having a staggered shingled seal configuration.

FIG. 6 illustrates another exemplary embodiment that provides a "shingle arrangement" to reduce fluid leakage. Here layered scrolls are sliced for flexibility in a shingled fashion. This exemplary seal system 120 includes a curved surface 104 of a tile 54 and a perpendicular surface 72 with an improved staggered split seal 122 that has a shingle arrangement 126. Radial cuts 124 into the split seal 122 aid to resist warping if there is a thermal gradient under the ceramic tile causing different pieces of the scroll or strip to unroll differently. If the design does require radial cuts, a scroll 128 within a scroll 130 with the radial cuts 124 may be provided to create shingling arrangement 126 to cover over the leakage area provided by the cuts 124. The first scroll 128 lays over the tops of a second scroll 130 in an offset shingled pattern so that a first cut 132 does not overlap a second cut 134. Such a shingled arrangement affords benefits over the FIG. 5 single layer arrangement in that fluid leakage is minimized. The seal 122 may be comprised of more than one material type, shape, and/or contain varying property/performance characteristics.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A seal for use with a machine comprising:
   an open fluid path in a machine, the fluid path extends between fixed members that are components of the machine; and
   a first bi-metal valve that is located in proximity to the open fluid path, the valve is made of a bi-metal strip that is operable to move between a first position and a second position during a heating event, the valve is operable to block the fluid path;
   wherein:
      each of the fixed members is a tile formed of ceramic material, the tile is used in conjunction with a component of the machine; and
      the bi-metal valve is secured to the component by the fastener.

2. The seal as claimed in claim 1, further comprising the fastener that secures the bi-metal valve relative to one of the fixed members.

3. The seal as claimed in claim 1, further comprising a clearance point that defines an open fluid channel that is bound on one side by a surface of one of the fixed members and by a surface of the bi-metal strip.

4. The seal as claimed in claim 1, further comprising a second bi-metal valve that is located behind the first bi-metal valve, the second bi-metal valve is in the fluid path and operates along with the first bi-metal valve to control fluid flow as the machine operates.

5. The seal as claimed in claim 1, wherein the component is a combustor of a gas turbine engine.

6. The seal as claimed in claim 1, wherein the tile has a curved surface.

7. The seal as claimed in claim 1, further comprising a combustor liner, one of the fixed members are located adjacent to the combustor liner and a fastener secures them together.

8. The seal as claimed in claim 1, further comprising a sealing surface that is located at a contact area between one of the fixed members and the bi-metal valve.

9. The seal as claimed in claim 1, wherein one of the fixed members has a planar portion and a substantially perpendicular portion, the valve is positioned to clear the perpendicular portion when the seal is coiled up and in a static like configuration.

10. The seal as claimed in claim 2, wherein the fastener is removable, and once removed, a new bi-metal valve may be installed and a new fastener may be installed.

11. A seal system for use with a machine comprising:
   a first tile;
   a second tile spaced apart from the first tile;
   a fluid channel extending in between the first and second tiles;
   a bi-metal strip having a mounting portion and a scrolled section;
   a securing member for connecting the bi-metal strip and one of the tiles together; and
   an engine member, the bi-metal strip is secured to the engine member by the securing member.

12. The seal system as claimed in claim 11, wherein the engine member is a combustor.

13. The seal system as claimed in claim 11, wherein the bi-metal strip is constructed of material that permits the scrolled section to expand as temperatures increase when the machine operates.

14. The seal system as claimed in claim 11, wherein the bi-metal strip expands and creates a seal against one of the tiles during an elevated temperature condition, and the bi-metal strip contracts during a reduced temperature condition.

15. The seal system as claimed in claim 11, further comprising another bi-metal strip that is secured to one of the tiles.

16. A method of controlling a fluid path in a gas turbine engine, the method comprising the steps of:
   providing a first fixed member;
   providing a second fixed member;
   providing a fluid path that is located between the first and second fixed members; and
   providing a flexible valve that is secured to one of the first and second fixed members and is located in the fluid path, the flexible valve is operable to move between various positions based on gas turbine operating temperatures, the positions include:
      a first position which is a low temperature condition, whereby the first position maintains the fluid flow path in an open state, and
      a second position which is an elevated temperature condition, whereby the second position maintains the fluid flow path in a closed state and the fluid flow path is blocked;
   wherein:
      the first fixed member and the second fixed member are tiles formed of ceramic material, the tiles are used in conjunction with an engine member of the machine; and
      the flexible valve is a bi-metal valve secured to the engine member by a fastener.

17. The method as claimed in claim 16, further comprising the step of a third position, whereby during the third position the fluid flow path is opened as the flexible valve moves back towards the first position.

18. The method as claimed in claim 16, whereby the engine member is a combustor.

19. The method as claimed in claim 16, wherein the first and second fixed members are made of a ceramic matrix composite material.

20. The method as claimed in claim 16, further comprising the step of replacing the flexible valve with a new flexible valve.

* * * * *